(12) United States Patent
Franz et al.

(10) Patent No.: US 12,066,052 B2
(45) Date of Patent: Aug. 20, 2024

(54) COMPACT SCREW-LATCHING ASSEMBLY WITH OVERDRIVE PROTECTION

(71) Applicant: Hewlett Packard Enterprise Development LP, Houston, TX (US)

(72) Inventors: John P. Franz, Tomball, TX (US); Robert E. Mascia, Chippewa Falls, WI (US); Michael Dustin Scott, Chippewa Falls, WI (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 220 days.

(21) Appl. No.: 17/499,653

(22) Filed: Oct. 12, 2021

(65) Prior Publication Data

US 2023/0111661 A1 Apr. 13, 2023

(51) Int. Cl.
*F16B 21/00* (2006.01)
*F16B 5/02* (2006.01)
*F16B 35/04* (2006.01)

(52) U.S. Cl.
CPC .......... *F16B 5/0266* (2013.01); *F16B 35/044* (2013.01)

(58) Field of Classification Search
CPC .... F16B 35/044; F16B 5/0266; F16B 35/041; F16B 35/048
USPC .......................... 292/149, 155, 176; 411/347
See application file for complete search history.

(56) References Cited

U.S. PATENT DOCUMENTS

| | | | |
|---|---|---|---|
| 177,485 A * | 5/1876 | Edwards | |
| 3,052,942 A * | 9/1962 | Mulvaney | F16B 41/002 411/347 |
| 4,720,223 A * | 1/1988 | Neights | B25B 23/00 411/533 |
| 6,363,670 B1 * | 4/2002 | Dewitt | E06B 9/02 49/463 |
| 6,668,308 B2 | 12/2003 | Barroso et al. | |
| 7,613,569 B2 | 11/2009 | Sherony et al. | |
| 8,311,954 B2 | 11/2012 | Ning et al. | |
| 8,794,889 B2 * | 8/2014 | Aukzemas | F16B 31/04 411/107 |
| 9,713,388 B2 | 7/2017 | Goldsmith | |
| 2009/0283243 A1 * | 11/2009 | Zha | H01L 23/4006 411/347 |
| 2012/0130771 A1 | 5/2012 | Kannan et al. | |
| 2013/0189049 A1 * | 7/2013 | Stotz, Jr. | F16B 5/0266 411/111 |

(Continued)

*Primary Examiner* — Gary W Estremsky
(74) *Attorney, Agent, or Firm* — Park, Vaughan, Fleming & Dowler LLP

(57) ABSTRACT

A screw-latching assembly is provided. The assembly includes a screw with a head, a tip, and a body between the head and tip. The body includes a threaded portion adjacent to the tip and an unthreaded portion adjacent to the head, and the unthreaded portion includes a built-in collar with an outer diameter larger than that of the body. The assembly includes a supporting bracket supporting and partially encompassing a first portion of the screw. The supporting bracket includes a base and multiple sidewalls, with a first sidewall comprising a first opening to allow a second portion of the screw to extend out of the supporting bracket and a second sidewall comprising a second opening to allow access to the head by a torquing tool. The assembly includes a spring surrounding at least a portion of the body, with the spring positioned between the built-in collar and the first sidewall.

11 Claims, 11 Drawing Sheets

(56) References Cited

U.S. PATENT DOCUMENTS

| | | | |
|---|---|---|---|
| 2014/0014792 A1* | 1/2014 | Willis | F16B 43/005 |
| | | | 411/347 |
| 2014/0064876 A1* | 3/2014 | Tseng | F16B 5/0208 |
| | | | 411/147 |
| 2014/0147228 A1* | 5/2014 | Kobayashi | H01R 13/6215 |
| | | | 411/103 |
| 2015/0104102 A1 | 4/2015 | Carreira et al. | |
| 2017/0243084 A1 | 8/2017 | Soatto et al. | |
| 2019/0003501 A1* | 1/2019 | Wu | F16B 5/0208 |
| 2019/0264727 A1* | 8/2019 | Wymore | F16B 5/0266 |
| 2019/0323236 A1* | 10/2019 | Grove | F16B 5/0208 |
| 2020/0134016 A1 | 4/2020 | Cao et al. | |
| 2020/0158150 A1* | 5/2020 | Su | F16B 5/0208 |
| 2020/0160836 A1 | 5/2020 | Chen et al. | |
| 2020/0291984 A1* | 9/2020 | Wang | F16B 5/0258 |
| 2020/0293888 A1 | 9/2020 | Meyerson et al. | |
| 2021/0025438 A1* | 1/2021 | Wang | F16B 5/0208 |
| 2021/0071701 A1* | 3/2021 | Chiang | F16B 5/0208 |

* cited by examiner

COMPACT SCREW-LATCHING ASSEMBLY WITH OVERDRIVE PROTECTION

BACKGROUND

This disclosure is generally related to a screw-latching mechanism. More specifically, this disclosure is related to a low-cost, compact jack screw assembly that has built-in overdrive protection.

BRIEF DESCRIPTION OF THE FIGURES

In the figures, like reference numerals refer to the same figure elements.

DETAILED DESCRIPTION

Figure 1:
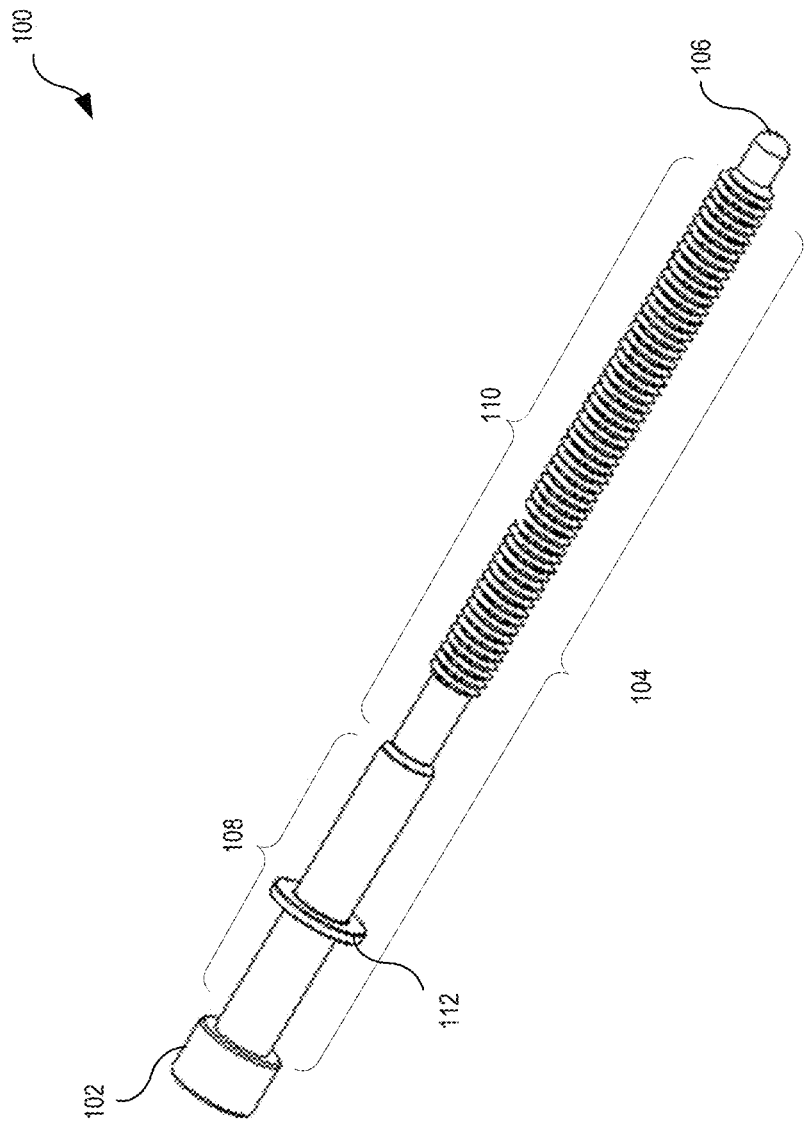
FIG. 1 presents a diagram illustrating a jack screw with built-in overdrive protection, according to one aspect of the instant application.

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

This disclosure provides a screw-latching assembly that has a built-in overdrive protection mechanism to eliminate or reduce the risk of overdriving the screw. More specifically, threads are removed from a portion of the screw body (e.g., the screw body includes an unthreaded portion) such that, when the screw is driven through a nut to its desired location, it is disengaged from the nut at the unthreaded portion. This stops the forward motion of the screw, thus preventing overdrive. To facilitate the removal of the screw, the screw body can further include a built-in collar positioned between the unthreaded portion and a head of the screw. In addition to the screw, the screw-latching assembly can include a supporting bracket, a snap-on cover, and a bias spring. When the different parts of the screw-latching assembly are assembled, the bias spring is compressed between the built-in collar on the screw and a sidewall of the supporting bracket. The snap-on cover attaches to the supporting bracket to create an enclosure for the bias spring and the corresponding screw portion. When a user attempts to remove the screw, the compressed spring can push the screw away from the nut such that the thread on the screw can re-engage with the nut automatically. An additional useful feature can be a tip of the screw being "bullet" shaped and not threaded to provide self-alignment with the nut.

In general, jack screws were initially used in electronic industries to facilitate the mating between electrical connectors and then later used to mount electrical modules (e.g., switches, servers, power supplies, etc.) to a rack or chassis. They can be used to align the modules to the pre-designated slots on the rack/chassis and can overcome the large friction forces involved in inserting or removing the modules. Note that to ensure a snug fit between the module and the slot, the module surfaces and the slot surfaces may be slightly wedged, meaning that a certain amount of force is needed to insert the module into the slot.

Manual installation of the jack screws, especially long screws that are used to accommodate long engagement distances, can be too difficult or tedious and time-consuming. Hence, the screws are often driven in by power tools (e.g., drills), which can cause damage to the screws and even the attached devices if the screws are overdriven. To prevent screw overdrive, a calibrated torque device (e.g., a calibrated torque driver) can be used. However, an inaccurate torque setting (e.g., a higher than required setting) of the calibrated torque device may still result in damages. Moreover, calibrated torque devices can be expensive and are more commonly used in manufacturing settings. They may be unavailable at a customer site.

To provide overdrive protection, an improved conventional jack screw can be modified to include a built-in overdrive protection mechanism. FIG. 1 presents a diagram illustrating a jack screw with built-in overdrive protection, according to one aspect of the instant application. In FIG. 1, screw 100 can include a head 102, a body 104, and a tip 106.

Head 102 can be similar to a conventional screw head. For example, head 102 can be flat or non-flat, round or hex shaped, socket head or button head. In the example shown in FIG. 1, head 102 is a socket head. Similarly, head 102 can have various drive types, including but not limited to: Phillips, slotted, socket, etc. The scope of this disclosure is not limited by the shape and drive type of screw head 102.

Tip 106 is on the opposite side of screw 100 as head 102. As shown in FIG. 1, tip 106 can be bullet-nose shaped (e.g., having a cylindrical body and a pointing or cone-shaped tip) and has no thread. This can facilitate self-alignment between screw 100 and a nut to be engaged with screw 100 (e.g., as described in more detail below).

Body 104 can include a shank portion 108 and a nut-engagement portion 110. When screw 100 is driven into a matching nut, the nut can be in contact with nut-engagement portion 110. Shank portion 108 connects head 102 with nut-engagement portion 110.

Like the shank of a conventional screw, shank portion 108 does not have threads. However, unlike the shank of a conventional screw that has a uniform or gradually changing diameter, shank portion 108 includes a built-in collar 112, which is a small section having an enlarged diameter. Built-in collar 112 can play an important role in the removal of the jack screw, which will be discussed in more detail below. The outer diameter of shank portion 108 (excluding built-in collar 112) can be similar to that of nut-engagement portion 110. It is also possible for shank portion 108 to have a slightly larger or smaller outer diameter than that of nut-engagement portion 110. Other than built-in collar 112, the size of shank portion 108 is less critical.

As shown in FIG. 1, nut-engagement portion 110 can include both a threaded portion and an unthreaded portion. The threaded portion is adjacent to tip 106 and the unthreaded portion is on the opposite side. The outer diameter of the non-threaded or unthreaded portion is smaller than that of the threaded portion. According to one aspect of the application, the outer diameter of the non-threaded portion can be similar to or no larger than a root diameter of the threaded portion. Note that the root diameter of the threaded portion can be measured by removing the threads. Different types of threads can be used on the threaded portion of nut-engagement portion 110. According to one aspect, the threads can be M4 threads.

When screw 100 is driven toward a compatible nut, tip 106 first enters a center cavity of the nut. The bullet-nose shape of tip 106 can facilitate the alignment between screw 100 and the nut, especially in cases where the nut is floating (e.g., having a certain degree of freedom to move around). Using a floating nut can facilitate the self-alignment of the screw and can provide a certain amount of tolerance. It is also possible to use a nut having a fixed position.

As screw 100 is driven into the nut (e.g., by a torquing tool), the threads on nut-engagement portion 110 engage with the threads on the inner surface of the nut, and the rotating motion of the torquing tool can be converted to a linear motion of screw 100, pushing it forward through the center cavity of the nut. As screw 100 continues to move forward, the threaded portion of nut-engagement portion 110 can completely pass through the center cavity of the nut, and the unthreaded portion of nut-engagement portion 110 enters the center cavity of the nut, causing screw 100 to disengage from the nut. Once the threads (e.g., threads from screw 100 and the nut) are disengaged from each other, continuous application of a torquing force (e.g., by a torquing tool) on screw 100 will only result in rotation of screw 100, with no conversion to forward motion of screw 100. This can effectively prevent overdrive and any possible damage to screw 100 or the attached device. Note that because the outer diameter of shank portion 108 is typically larger than the inner diameter of the nut, pushing screw 100 forward toward the nut will not result in shank portion 108 passing through the nut.

The length of nut-engagement portion 110 can be determined based on a required or desired travel distance of screw 100 (e.g., how far screw 100 needs to be driven into the nut). For example, the nut can be located on the chassis and screw 100 can be attached to the module. As the module is being pushed into a designated slot on the chassis, screw 100 engages the nut. The relative locations of screw 100 and the nut can determine the length of nut-engagement portion 110. Note that when the module is pushed all the way into the designated slot (or when screw 100 has been driven to its desired location), the threaded portion of nut-engagement portion 110 has completely passed through the center cavity of the nut, and the nut now surrounds the unthreaded portion of nut-engagement portion 110. Similarly, the length of shank 108 can be determined based on the geometry of the screw assembly, which attaches screw 100 to the electrical module.

As shown by FIG. 1, overdrive of a screw can be prevented by removing the threads from the top or upper portion of the nut-engagement portion of a screw (e.g., the unthreaded portion). However, once driven into the desired position, threads on the screw are no longer engaged with threads on the nut, which can be problematic for retracting the screw using a torquing tool, because application of the torque can only cause the screw to rotate instead of backing up from the nut. To solve this problem, a spring mechanism can be introduced. When a user attempts to remove the screw from the nut (e.g., using the torquing tool to reverse-rotate the screw), the spring mechanism can push the screw away from the nut, such that the threads on the screw can re-engage with the threads on the nut, thus allowing the user to retract the screw from the nut using the torquing tool.

Figure 2A:
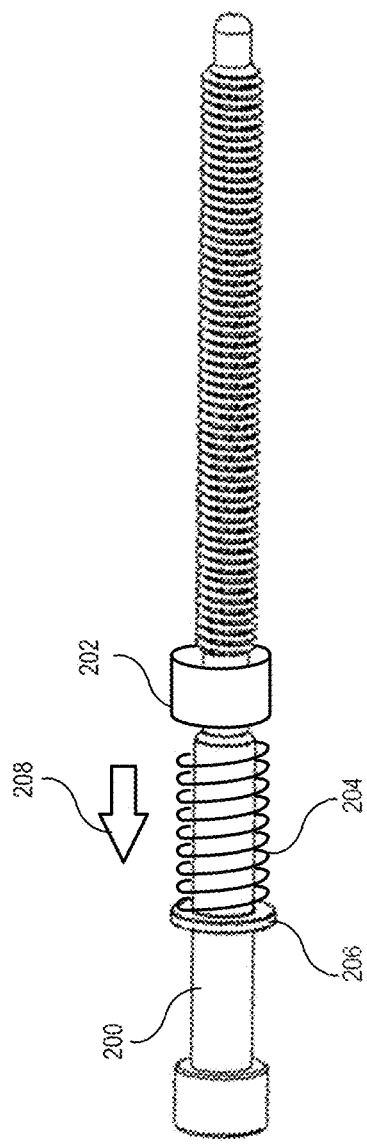
FIG. 2A presents a diagram illustrating the spring mechanism that facilitates the retraction of the jack screw with built-in overdrive protection, according to one aspect of the instant application.

According to one aspect of the instant application, the spring mechanism can include a spring (also referred to as a bias spring) that surrounds the body of the screw and can be positioned between the built-in collar of the screw and the nut. FIG. 2A presents a diagram illustrating the spring mechanism that facilitates the retraction of the jack screw with built-in overdrive protection, according to one aspect of the instant application. In the example shown in FIG. 2A, jack screw 200 has been screwed all the way into a nut 202. Because jack screw 200 has built-in overdrive protection, when it is screwed all the way into nut 202, the threaded portion of jack screw 200 is now disengaged from nut 202. In other words, nut 202 is surrounding or resting against the unthreaded portion of jack screw 200.

FIG. 2A also shows a spring 204 positioned or otherwise disposed over the body of jack screw 200. This can be done by inserting the body of jack screw 200 into the center of spring 204. Because the outer diameter of built-in collar 206 of screw 200 is slightly larger than the outer diameter of spring 204, spring 204 can be stopped by built-in collar 206. When screw 200 is screwed all the way into nut 202, spring 204 is compressed between built-in collar 206 and nut 202, as shown in FIG. 2A. In other words, when screw 200 and nut 202 are in the driven- or screwed-in positions, spring 204 is compressed.

Figure 2B:
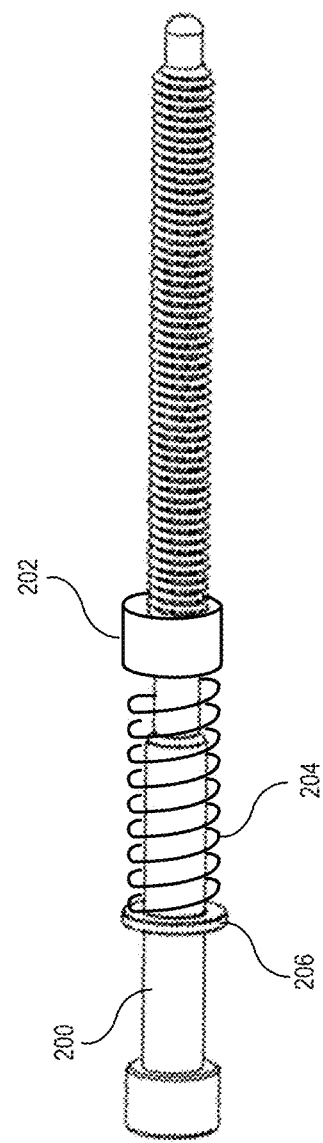
FIG. 2B illustrates that threads on nut 202 re-engage with threads on screw 200, according to one aspect of the instant application

Because threads on nut 202 are not engaged with threads on screw 200 when screw 200 is screwed or driven in entirely into or through nut 202, overdrive will be prevented. Continuous attempts to drive screw 200 (e.g., by applying toque using a torquing tool) results in rotational motion of screw 200, not forward (e.g., axial) motion of screw 200. On the other hand, when the user attempts to remove or retract screw 200 from nut 202, the user can use a torquing tool to apply a reverse torquing force. At the same time, compressed spring 204 pushes against built-in collar 206 and nut 202, pushing screw 200 away from nut 202, as shown by arrow 208. This pushing force from spring 204 can shift or otherwise displace screw 200 such that the threaded portion of screw 200 re-enters the center of nut 202. In the example shown in FIG. 2A, screw 200 will be shifted left (as indicated by arrow 208), thus resulting in the threads of screw 200 becoming re-engaged with the threads in nut 202. Once the threads are engaged, rotation of screw 200 can be converted to linear motion to the left, causing screw 200 to retract from nut 202. FIG. 2B illustrates that threads on nut 202 re-engage with threads on screw 200, according to one aspect of the instant application. In FIG. 2A and FIG. 2B, the position of nut 202 remains substantially unchanged. As a user applying a reverse torquing force on screw 200, spring 204 decompresses, as shown in FIG. 2B. As it decompress, spring 204 pushes screw 200 (e.g., by pushing against built-in collar 206) to the left, causing the threaded portion of screw 200 to be pulled toward nut 202 such that the threads on screw 200 re-engage with the threads on nut 202. Hence, the reverse torquing force from the user rotates screw 200 and causes screw 200 to retract from nut 202, as shown in FIG. 2B.

In the examples shown in FIG. 1 and FIGS. 2A-2B, there are two unthreaded segments on the screw body, and the two segments have different sizes (e.g., diameters). In practice, it is also possible to have a single unthreaded segment positioned between the head of the screw and the threaded portion of the screw. This single unthreaded segment can have a built-in collar that pushes or is configured to push against the spring. The built-in collar can be an integral part of screw 200 and can be formed monolithically along with the rest portion of screw 200. The outer diameter of the single unthreaded segment can be similar to or slightly smaller than the inner diameter of the corresponding nut to allow a portion of the unthreaded segment to fit inside the center cavity of the nut (e.g., without engaging the nut).

Figure 3A:
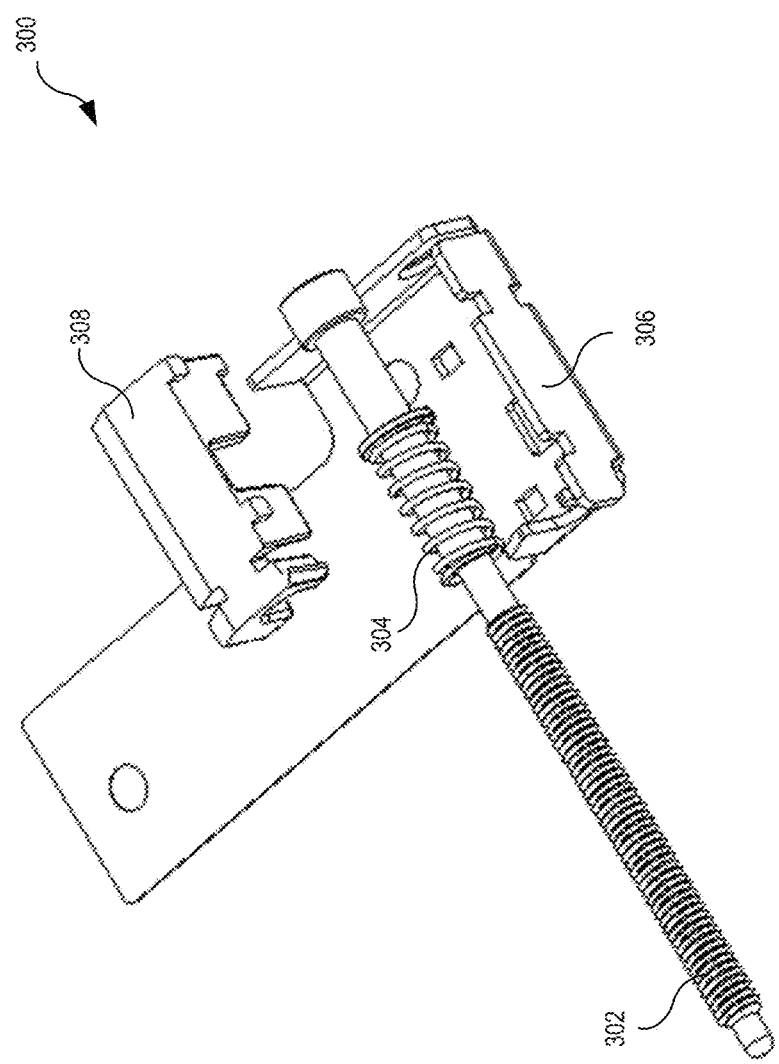
FIG. 3A illustrates various components of a screw-latching assembly with built-in overdrive protection, according to one aspect of the instant application.

It is possible to provide a screw-latching assembly as described herein using the combination of screw 200, nut 202, and spring 204, as shown in FIGS. 2A-2B. However, additional parts or components may be needed to form a screw-latching assembly that can facilitate the mounting of an electrical module to a chassis. FIG. 3A illustrates various components of a screw-latching assembly with built-in overdrive protection, according to one aspect of the instant application. Screw-latching assembly 300 can include a screw 302, a spring 304, a supporting bracket 306, and a cover 308.

Figure 3B:
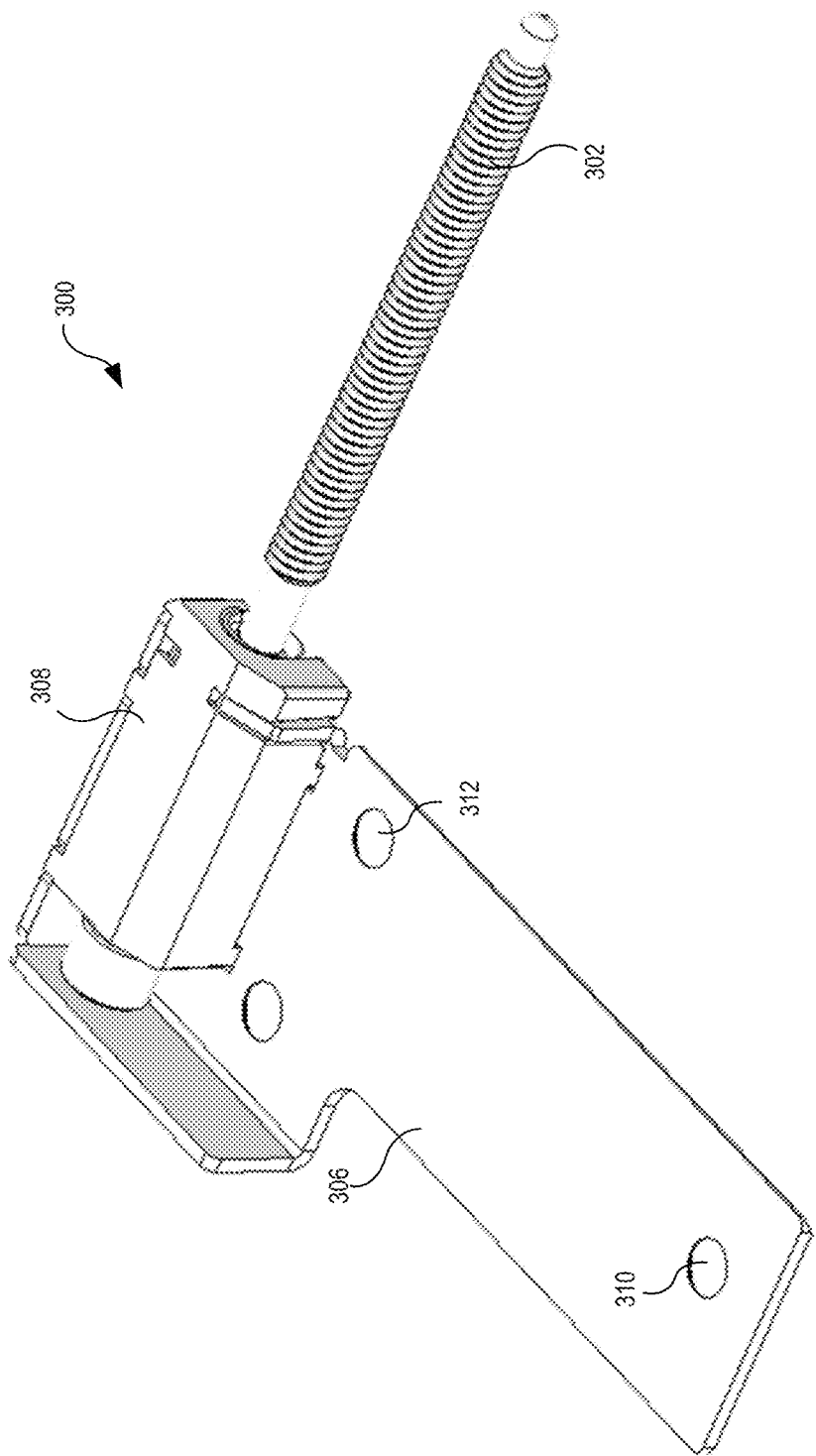
FIG. 3B shows the assembled screw-latching assembly, according to one aspect of the instant application.

Screw 302 and spring 304 can be similar to screw 200 and spring 204 shown in FIGS. 2A-2B. Supporting bracket 306 can be used to attach screw-latching assembly 300 to an electrical module, thus facilitating the mounting of the electrical module to the chassis. Moreover, supporting bracket 306 and cover 308 can form a physical enclosure for screw 302 and spring 304 to ensure that these two loose components can be kept together and attached to supporting bracket 306. FIG. 3B shows the assembled screw-latching assembly, according to one aspect of the instant application. In FIG. 3B, cover 308 is securely attached (e.g., via a snap-on mechanism) to supporting bracket 306, and the top portion of screw 302 and spring 304 (out of view in FIG. 3B) are enclosed inside a cavity formed by supporting bracket 306 and a cover 308. The entire assembly can be attached to an electrical module (e.g., a server, a switch, or a power supply) via one or more through holes (e.g., holes 310 and 312) on supporting bracket 306. For example, additional screws (not shown in FIG. 3B) can be used to attach screw-latching assembly 300 to an electrical module (also not shown in FIG. 3B).

Figure 4A:
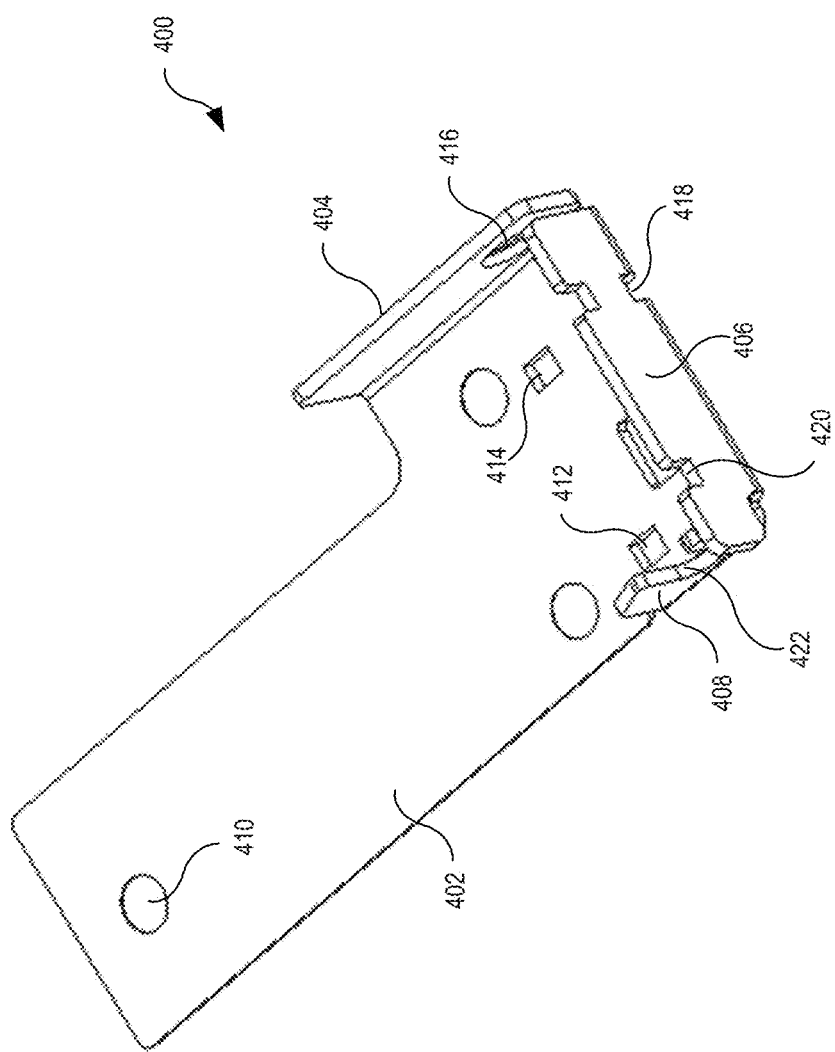
FIG. 4A illustrates in more detail the supporting bracket, according to one aspect of the instant application.

FIG. 4A illustrates in more detail the supporting bracket, according to one aspect of the instant application. Supporting bracket 400 facilitates the attachment of the screw-latching assembly to the electrical module. To provide a strong bond, supporting bracket 400 is typically made of metal (e.g., stainless steel). Supporting bracket 400 can have various shapes, depending on the geometry of the electrical module. In the example shown in FIG. 4A, supporting bracket 400 can include a base 402 and sidewalls 404, 406, and 408.

Base 402 can include one or more circular through holes (e.g., hole 410) that facilitate the attachment of supporting bracket 400 to an electrical module. Various types of attaching mechanism (e.g., a screw-attaching mechanism) can be used. In the example shown in FIG. 4A, there are three through holes on base 402. In practice, there can be more or fewer holes used for attaching supporting bracket 400 to an electrical module. Base 402 can also include a number of square peg holes (e.g., peg holes 412 and 414) that correspond to pegs on the cover (e.g., cover 308 shown in FIG. 3A). Inserting the corresponding pegs on the cover into these peg holes can bind the cover to base 402.

FIG. 4A also shows a number of sidewalls positioned on edges of base 402. Two of the sidewalls (sidewalls 406 and 408) can be mechanically coupled to a cover positioned on top of base 402, and base 402 together with the cover can form a substantially enclosed cavity to house the screw and the spring surrounding the screw. More specifically, sidewall 408 includes a U-shaped opening 422 that allows the bottom portion of the screw to exit the enclosed cavity. In addition to the peg holes on base 402, additional peg holes (e.g., peg hole 418) can also be formed on the interfacing edge between sidewall 406 and base 402. Similarly sidewall 406 can additionally include a number of recesses (e.g., recess 420) for receiving corresponding pegs on the cover. The shapes and sizes of the peg holes and recesses on supporting bracket 400 can be determined based on the sizes and shapes of the pegs on the cover such that the pegs on the cover can be snap-fitted into the peg holes on supporting bracket 400.

Sidewall 404 of supporting bracket 400 includes a tool-access aperture 416. When the screw is in position (e.g., when it is enclosed by supporting bracket 400 and the cover, the head of the screw can be placed adjacent to tool-access aperture 416, thus allowing a torquing tool (e.g., a torque driver) to access the head of the screw (e.g., engaging with the head to turn the screw).

Figure 4B:
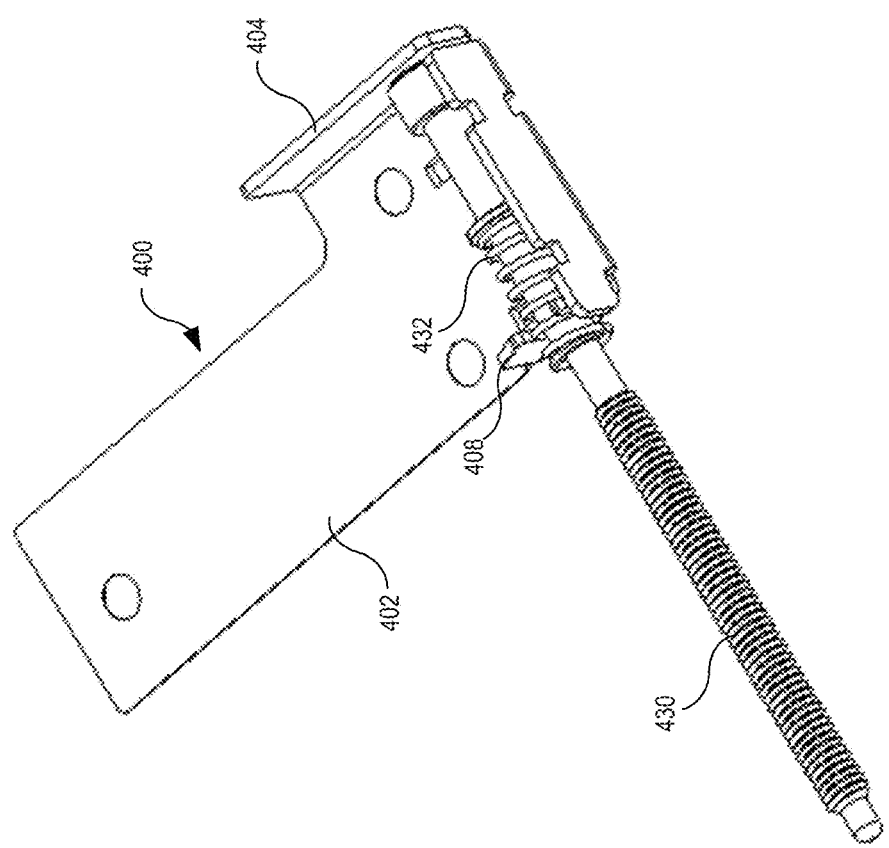
FIG. 4B illustrates the screw being placed in position on the supporting bracket, according to one aspect of the instant application.

FIG. 4B illustrates the screw being placed in position on the supporting bracket, according to one aspect of the instant application. In FIG. 4B, screw 430 rests on base 402 of supporting bracket 400. The head of screw 430 is positioned against sidewall 404 to allow a torquing tool to access the head via the tool-access aperture on sidewall 404. The bottom portion of screw 430 exits supporting bracket 400 from the U-shaped opening on sidewall 408. More specifically, one end of spring 432 is pushed against the built-in collar of screw 430. In the example shown in FIG. 4B, the other end of spring 432 extends beyond sidewall 408. According to one aspect, the other end of spring 432 can push against a corresponding sidewall on the cover. According to an alternative aspect, the other end of spring 432 can push against sidewall 408. Note that the length of spring 432 can be selected in a way such that spring 432 is compressed by the built-in collar of screw 430 and sidewall 408 (or a sidewall on the cover).

Figure 5A:
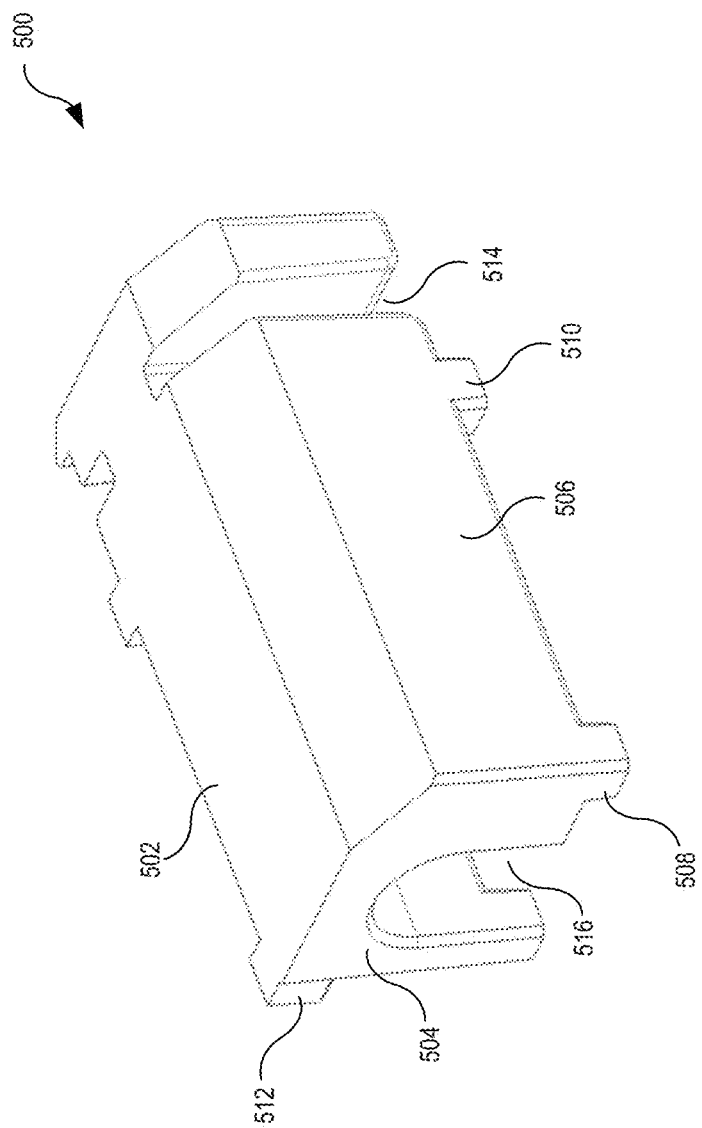
FIG. 5A illustrates in more detail the cover, according to one aspect of the instant application.

FIG. 5A illustrates in more detail the cover, according to one aspect of the instant application. Cover 500 is typically made of a flexible material, such as molded plastic, such that snap-fit bindings can be formed between cover 500 and the metal supporting bracket. Cover 500 can include a roof 502 and a number of sidewalls (e.g., sidewalls 504 and 506). As discussed previously, the cover, including its roof 502 and sidewalls, together with the base of the supporting bracket can form a substantially enclosed cavity to enclose the spring along with a portion of the screw.

FIG. 5A also shows that cover 500 includes a number of pegs used for binding with the supporting bracket. More specifically, pegs 508 and 510 are positioned at the bottom of sidewall 506. These pegs can be inserted into the peg holes on the base of the supporting bracket (e.g., peg holes 412 and 414). Additional pegs (e.g., peg 512) can be attached to roof 502. These pegs can be inserted into the recesses on the sidewall (e.g., sidewall 406) of the supporting structure. Sidewall 506 can include a slot 514, which allows sidewall 506 to interlock with a corresponding sidewall (e.g., sidewall 408) on the supporting bracket. A sidewall opposite of sidewall 506 (which is mostly out of view in FIG. 5A) can include a similar slot. Like sidewall 408 of supporting bracket 400, sidewall 504 of cover 500 can also include a U-shaped opening 516 to allow the bottom portion of the screw to exit the cavity formed by cover 500 and the supporting bracket 400. More specifically, these two U-shaped openings are complementary to each other to confine the bottom portion of the screw (e.g., to prevent movement of the screw once it is placed in position).

Figure 5B:
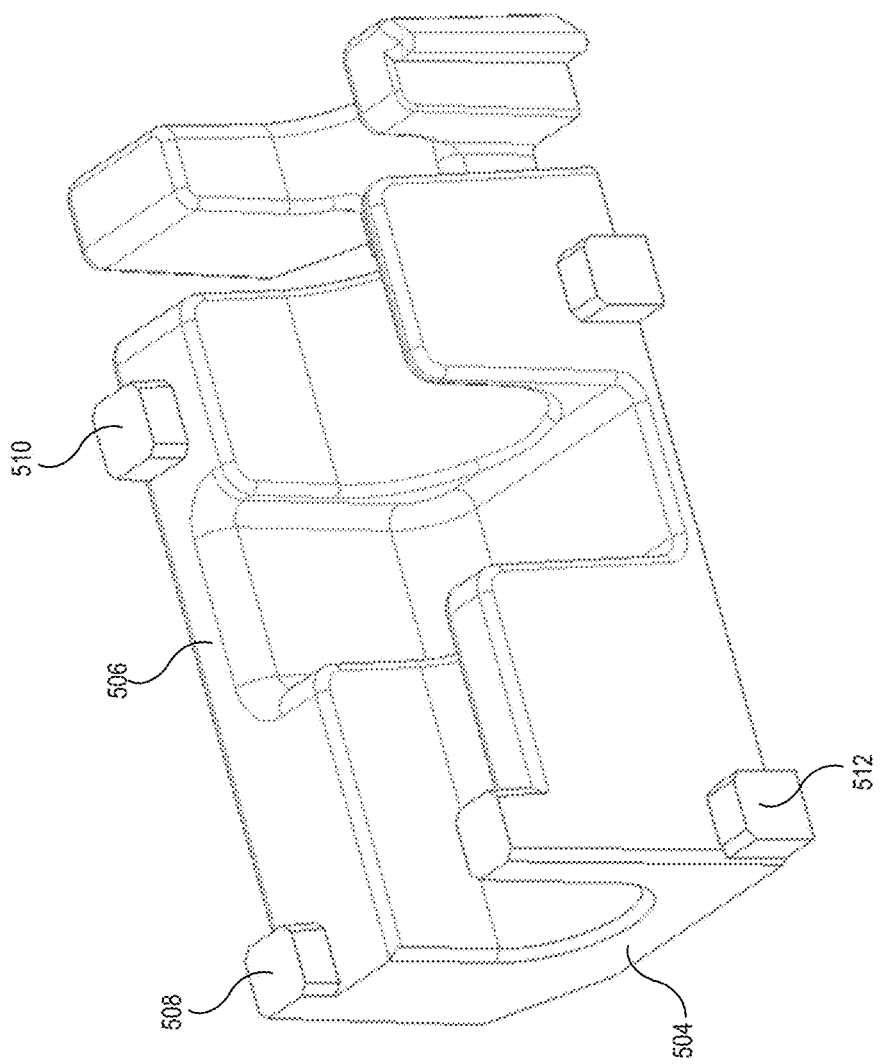
FIG. 5B illustrates a different view of cover 500, according to one aspect of the instant application.

FIG. 5B illustrates a different view of cover 500, according to one aspect of the instant application. More specifically, pegs 508, 510, and 512 are shown in a greater detail.

Figure 6:
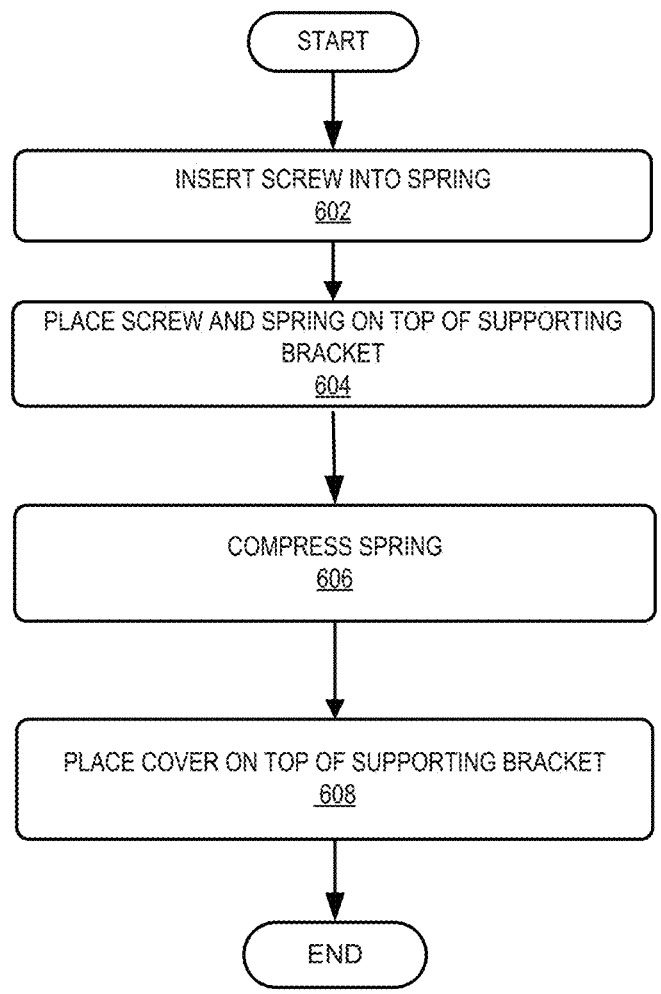
FIG. 6 presents a flowchart illustrating a process for assembling the screw-latching assembly, according to one aspect of the instant application.

FIG. 6 presents a flowchart illustrating a process for assembling the screw-latching assembly, according to one aspect of the instant application. During operation, a user can insert, from its tip, the body of a screw into the center of a spring (operation 602). The size of the spring can be selected based on the size of the screw. For example, the inner diameter of the spring can be slightly larger than the outer diameter of the body of the screw to allow the body of the screw to fit into the center of the spring.

Subsequently, the user can place the screw along with the spring on top of the supporting bracket (operation 604). As shown in FIG. 4B, when the screw is placed on the supporting bracket, the head of the screw is placed adjacent to the tool-access aperture on a sidewall of the supporting bracket to allow a torquing tool to access the head of the screw in order to turn the screw. The bottom portion of the screw extends beyond the supporting bracket via a U-shaped opening on a sidewall opposite to the sidewall with the tool-access aperture.

Once the screw is placed on the supporting bracket, the user can compress the spring against the built-in collar on the screw (operation 606) and place the cover on top of the supporting bracket to enclose the top portion of the screw and the spring to complete the screw-lathing assembly (operation 608). Note that the spring needs to be compressed in order to fit inside the cavity formed by the supporting bracket and the cover. As discussed previously, the cover can include a number of pegs that can be inserted into corresponding peg holes and recesses on the supporting bracket, thereby securely binding the cover to the supporting bracket.

Once the screw-latching assembly is formed, it can be attached onto an electrical module (e.g., via the through holes on the base of the supporting bracket) and can be used to bind the electrical module to an equipment rack or chassis.

Figure 7A:
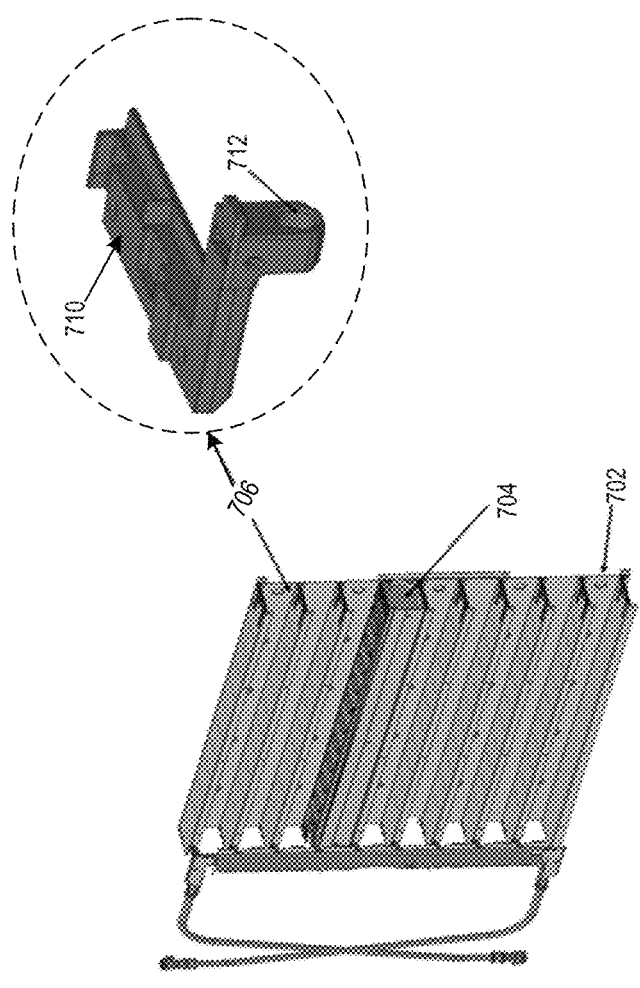
FIG. 7A illustrates a multi-slot equipment rack, according to an aspect of the instant application.

FIG. 7A illustrates a multi-slot equipment rack, according to an aspect of the instant application. Equipment rack 700 can include a number of slots for inserting electrical modules. More specifically, FIG. 7A shows a number of empty slots (e.g., empty slot 702) and an electrical module 704 inserted into one of the slots. According to one aspect, electrical module 704 can be a power supply. Each slot can include a roof and a nut-supporting bracket (e.g., bracket 706) attached to the roof. More specifically, the roof of an upper slot and the roof of a lower slot form a space for insertion of the electrical module. FIG. 7A also shows the amplified view (included in the dashed circle) of the nut-supporting bracket. More specifically, nut-supporting bracket 706 can include a base 710 and a cavity 712. Base 710 allows nut-supporting bracket 706 to be attached to the roof of a slot, and cavity 712 provides a space for the nut to be placed inside. Cavity 712 can be larger than the nut to allow the nut to be placed inside in a floating style. Floating the nut can provide a certain amount of tolerance.

Figure 7B:
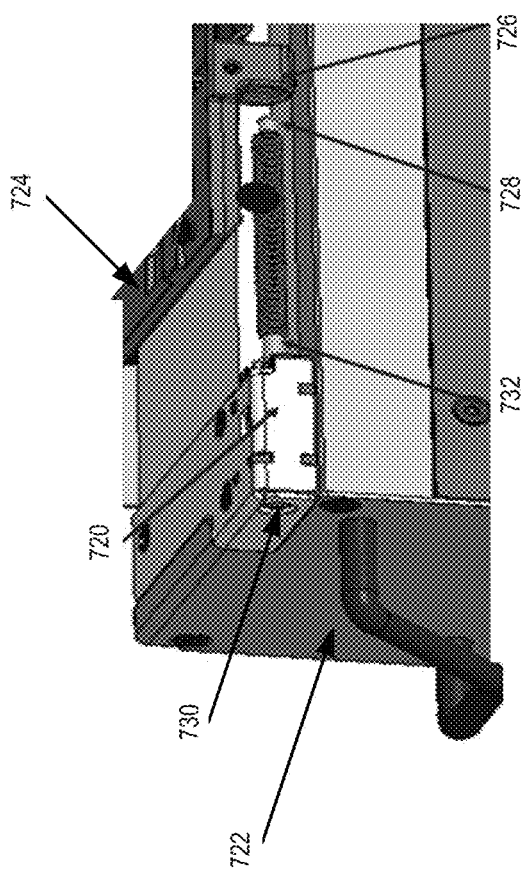
FIG. 7B illustrates the attachment between the screw-latching assembly and the nut-supporting bracket, according to one aspect of the application.

FIG. 7B illustrates the attachment between the screw-latching assembly and the nut-supporting bracket, according to one aspect of the application. In FIG. 7B, screw-latching assembly 720 is attached to an electrical module 722 via a number of through holes on its base. More specifically, FIG. 7B shows that the base of screw-latching assembly 720 is placed on top of electrical module 722 with the rest of screw-latching assembly 720, including the cover and the enclosed screw/spring, facing electrical module 722. In this example, electrical module 722 can include a recess to allow the placement of the other components of screw-latching assembly 720.

Nut-supporting bracket 724 can be attached to the roof of a slot on the equipment rack, which is not shown in FIG. 7B. A nut 726 can be placed inside the cavity on nut-supporting bracket 724. According to one aspect of the instant application, nut-supporting bracket 724 and nut 726 and screw-latching assembly 720 together form a latching mechanism that can bind two entities (e.g., electrical module 722 and the equipment rack) together. The dimension of nut-supporting bracket 704 is determined such that when electrical module 702 is pushed into the slot, the screw in screw-latching assembly 700 can be inserted and can engage with nut 706. FIG. 7B shows that, as electrical module 702 is pushed to the right, tip 708 of the screw will first enter the center cavity of nut 706. The bullet-nose shape of unthreaded tip 708 makes alignment between the screw and nut 706 easier.

Once the threads on the screw of screw-latching assembly 700 are engaged with the threads on nut 706, a user can use a torquing tool (e.g., an electrical powered torquing driver) to turn the screw (e.g., turn the screw clockwise). More specifically, the torquing tool can access the head of the screw via tool-access aperture 730 and rotate the screw by rotating the head. The rotation movement can be converted to a linear forward motion that pushes electrical module 722 to move forward. Moreover, the rotation of the screw can overcome the friction between the roof of the slot and electrical module 702, making it easier for electrical module 702 to be pushed into the slot.

When electrical module 722 completely enters the slot, the threaded portion of the screw also completely passes through nut 726, resulting in unthreaded portion 732 on the screw resting in the center cavity of nut 726. Because there is no thread on unthreaded portion 732, continuous rotation of the screw will not result in forward motion, thus preventing screw overdrive. On the other hand, when the user attempts to remove electrical module 722, the user can use the torquing tool to pull back the screw while reverse-turning the screw. The pulling force along with the pushing force on the built-in collar applied by the compressed spring inside screw-latching assembly 720 can shift the screw to the left, causing the threads on nut 706 to re-engage with the threads on the screw. Once the threads are re-engaged, rotation of the screw (e.g., counterclockwise rotation) can lead to the retraction of the screw and consequently the retraction of electrical module 722 from the corresponding slot on the equipment rack.

In general, this disclosure provides a mechanism for attaching an electrical module to an equipment rack/chassis without the risk of overdrive. More particularly, the attaching mechanism can include a screw-latching assembly with built-in overdrive protection mounted on the electrical module and a corresponding nut-supporting bracket mounted on the equipment rack/chassis. The screw-latching assembly can include a screw, a spring (also referred to as a bias spring), a supporting bracket, and a cover. Unlike conventional screws that do not have overdrive protection, the screw in the disclosed screw-latching assembly can include a built-in collar and an unthreaded portion immediately adjacent to the threads on the screw body, such that, when the screw is driven through the nut, it is disengaged from the nut at the unthreaded portion, thus preventing overdrive. The spring surrounds the body of the screw and is enclosed inside a cavity formed by the supporting bracket and the cover. More specifically, the spring is compressed inside the cavity by the built-in collar on the screw and a sidewall of the supporting bracket or cover. The compressed spring can push the screw away from the nut when a user attempts to remove the screw-latching assembly from the nut, thus reengaging the threads on the screw and the threads on the nut to facilitate the removal of the screw-latching assembly.

One aspect of the instant application provides a screw-latching assembly. The screw-latching assembly includes a screw with a head, a tip, and a body positioned between the head and tip. The body can include a threaded portion adjacent to the tip and an unthreaded portion adjacent to the head, and the unthreaded portion can further include a built-in collar with an outer diameter larger than that of the body. The screw-latching assembly can include a supporting bracket supporting and partially encompassing a first portion of the screw. The supporting bracket can include a base and multiple sidewalls, with a first sidewall comprising a first opening to allow a second portion of the screw to extend out of the supporting bracket and a second sidewall comprising a second opening to allow access to the head by a torquing tool. The screw-latching assembly further includes a spring surrounding at least a portion of the body of the screw, with the spring positioned between the built-in collar and the first sidewall.

In a variation on this aspect, the unthreaded portion can include a first segment positioned adjacent to the head and a second segment positioned between the first segment and the threaded portion.

In a further variation, the built-in collar is located on the first segment, and an outer diameter of the first segment is equal to or greater than an outer diameter of the threaded portion.

In a further variation, an outer diameter of the second segment is smaller than an outer diameter of the threaded portion such that the second segment fits inside a cavity of a nut when the screw is substantially driven into the nut, thus preventing overdrive of the screw.

In a further variation, outer diameters of the first and second segments are similar.

In a variation on this aspect, the screw-latching assembly can further include a cover to be attached to the supporting bracket to form an enclosure for the spring and the second portion of the screw.

In a further variation, the cover comprises multiple pegs to be inserted into corresponding peg holes on the supporting bracket.

In a further variation, the spring is compressed inside the enclosure, thus facilitating removal of the screw-latching assembly from a nut after the screw is substantially driven into the nut.

In a further variation, the supporting bracket comprises metal, and wherein the cover comprises plastic.

In a further variation, a sidewall of the cover comprises a slot to facilitate interlocking between the sidewall of the cover and the first sidewall of the supporting bracket.

In a variation on this aspect, the tip is unthreaded and has a bullet-nose shape, thereby facilitating alignment between the screw and a matching nut.

In a variation on this aspect, the base of the supporting structure can include one or more through holes to facilitate attachment of the screw-latching assembly to an electrical module.

One aspect of the instant application provides a screw with overdrive protection. The screw can include a head, a tip, and a body positioned between the head and tip. The body can include a threaded portion adjacent to the tip and an unthreaded portion adjacent to the head. The screw can further include a built-in collar positioned on the unthreaded portion of the body, with an outer diameter of the built-in collar being larger than that of the body.

In a variation on this aspect, the unthreaded portion can include a first segment positioned adjacent to the head and a second segment positioned between the first segment and the threaded portion.

In a further variation, the built-in collar is located on the first segment, and an outer diameter of the first segment is equal to or greater than an outer diameter of the threaded portion.

In a further variation, an outer diameter of the second segment is smaller than an outer diameter of the threaded portion such that the second segment fits inside a cavity of a nut when the screw is substantially driven into the nut, thus preventing overdrive of the screw.

In a further variation, outer diameters of the first and second segments are similar.

In a variation on this aspect, the screw can further include a spring surrounding at least a portion of the body of the screw.

In a further variation, the spring is compressed between the built-in collar and a nut when the screw is substantially driven into the nut, thus facilitating removal of the screw from the nut.

In a variation on this aspect, the tip is unthreaded and has a bullet-nose shape, thereby facilitating alignment between the screw and a matching nut.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A screw-latching assembly, comprising:
   a screw comprising a head, a tip, and a body positioned between the head and tip, wherein the body comprises a threaded portion adjacent to the tip and an unthreaded portion adjacent to the head, and wherein the unthreaded portion further comprises a built-in collar, the built-in collar having an outer diameter larger than that of the body;
   a supporting bracket supporting and partially encompassing a first portion of the screw, wherein the supporting bracket comprises a base and multiple sidewalls, wherein a first sidewall comprises a first opening to allow a second portion of the screw to extend out of the supporting bracket, and wherein a second sidewall comprises a second opening to allow access to the head by a torquing tool;
   a spring surrounding at least a portion of the body of the screw, wherein the spring is positioned between and contacting the built-in collar and the first sidewall;

a cover to be attached to the supporting bracket to form an enclosure for the spring and the second portion of the screw.

2. The screw-latching assembly of claim 1, wherein the unthreaded portion comprises a first segment positioned adjacent to the head and a second segment positioned between the first segment and the threaded portion.

3. The screw-latching assembly of claim 2, wherein the built-in collar is located on the first segment, and wherein an outer diameter of the first segment is equal to or greater than an outer diameter of the threaded portion.

4. The screw-latching assembly of claim 2, wherein an outer diameter of the second segment is smaller than an outer diameter of the threaded portion such that the second segment fits inside a cavity of a nut when the screw is substantially driven into the nut, thus preventing overdrive of the screw.

5. The screw-latching assembly of claim 4, wherein outer diameters of the first and second segments are similar.

6. The screw-latching assembly of claim 1, wherein the cover comprises multiple pegs to be inserted into corresponding peg holes on the supporting bracket.

7. The screw-latching assembly of claim 1, wherein the spring is compressed inside the enclosure, thus facilitating removal of the screw-latching assembly from a nut after the screw is substantially driven into the nut.

8. The screw-latching assembly of claim 1, wherein the supporting bracket comprises metal, and wherein the cover comprises plastic.

9. The screw-latching assembly of claim 1, wherein a sidewall of the cover comprises a slot to facilitate interlocking between the sidewall of the cover and the first sidewall of the supporting bracket.

10. The screw-latching assembly of claim 1, wherein the tip is unthreaded and has a bullet-nose shape, thereby facilitating alignment between the screw and a matching nut.

11. The screw-latching assembly of claim 1, wherein the base of the supporting structure comprises one or more through holes to facilitate attachment of the screw-latching assembly to an electrical module.

* * * * *